United States Patent [19]

Nagayama et al.

[11] Patent Number: 5,343,333
[45] Date of Patent: Aug. 30, 1994

[54] ELECTRICALLY REMOTE-CONTROLLED MIRROR ASSEMBLY

[75] Inventors: Yoshirou Nagayama; Yoshihiro Kubo, both of Isehara; Takao Sekino, Hiratsuka, all of Japan

[73] Assignee: Ichikoh Industries, Ltd., Tokyo, Japan

[21] Appl. No.: 931,486

[22] Filed: Aug. 19, 1992

[30] Foreign Application Priority Data

Aug. 19, 1991 [JP] Japan .................... 3-206741

[51] Int. Cl.$^5$ .......................... G02B 7/18; B60R 1/06
[52] U.S. Cl. .................................. 359/874; 359/877
[58] Field of Search ............ 359/872, 873, 874, 876, 359/877

[56] References Cited

U.S. PATENT DOCUMENTS

| 2,825,768 | 3/1958  | Beck .................... 200/24 |
| 4,498,738 | 2/1985  | Kumai ................... 359/874 |
| 4,632,525 | 12/1986 | Hayashi et al. .......... 350/634 |
| 4,678,295 | 7/1987  | Fisher .................. 359/874 |
| 4,915,493 | 4/1990  | Fisher et al. ........... 359/874 |

FOREIGN PATENT DOCUMENTS

| 0170296 | 2/1986  | European Pat. Off. ........ 359/877 |
| 0321716 | 6/1989  | European Pat. Off. ........ 359/877 |
| 3015528 | 10/1981 | Fed. Rep. of Germany . |
| 319861  | 10/1929 | United Kingdom . |

Primary Examiner—Ricky D. Shafer
Attorney, Agent, or Firm—Foley & Lardner

[57] ABSTRACT

An electrically remote-controlled mirror assembly having a pair of plungers driven by first and second motors for tilting the mirror about the horizontal and vertical axes, respectively, and for quick-rear-viewing, there is provided a mirror driving mechanism by which the mirror can be tilted further through a predetermined angle beyond the predetermined range of angulation for the normal car moving to an angular position suitable for viewing the rear wheel of the car and thereafter returned to its initial predetermined angular position. The mirror driving mechanism comprises a nut member which axially guides at least one of the plungers, a rotary member having a drive shaft slidable with respect to but blocked against pivoting relative to the plunger and which is intended to move the plunger forward and backward for the purpose of the quick-rear-viewing, and a third motor to rotate the rotary member, and an electrical control means responsive to the rotation of the rotary member to control the stopping and rotational direction of the third motor. The electrical control means is composed of an electrically conductive ball so disposed as to roll on a predetermined track, and two pairs of electric contacts, one of the pair being disposed at a first position corresponding to one end of the rolling track of the ball and the other pair being disposed at a second position corresponding to the other end of the rolling track.

6 Claims, 13 Drawing Sheets

Fig. 12(A)
Fig. 12(B)
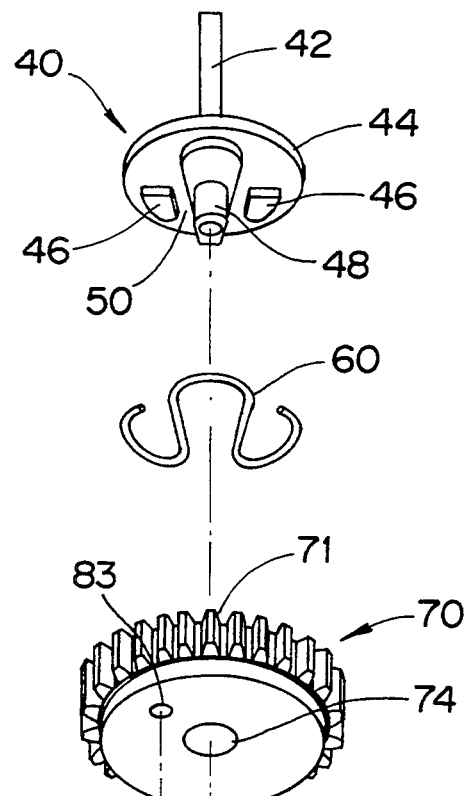
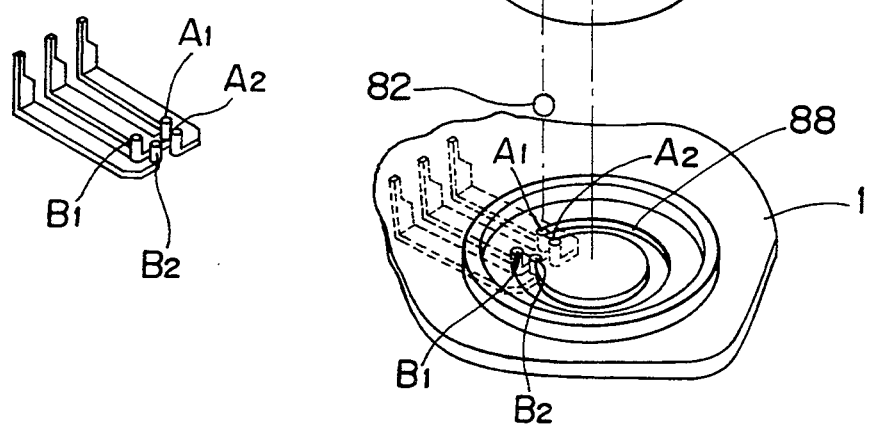

ELECTRICALLY REMOTE-CONTROLLED MIRROR ASSEMBLY

BACKGROUND OF THE INVENTION a. Field of the Invention

The present invention relates to an electrically remote-controlled mirror assembly for automobiles, and more particularly to a mirror driving apparatus in which the mirror is tilted for a predetermined time or through a predetermined angle from its initial position, especially to check for any obstacle behind the car in a wide rear field of view, and thereafter returned to its initial position.

b. Prior Art Statement

FIGS. 1 and 2 show a prior-art electrically remote-controlled mirror having a side-mirror driving apparatus arranged to adjust the angulation of the mirror by remote control.

FIG. 1 is a plan view of the side-mirror mirror driving apparatus having the mirror body 3 supporting the mirror removed, the drive unit casing 1 being shown as partially fragmented. FIG. 2 is a sectional view of the side-mirror assembly having the mirror body 3 mounted in place, a part of the mirror 4 being omitted for the simplicity of illustration.

FIG. 1 uses axes X-X' and Y-Y' for the convenience of illustration and explanation. There is provided in a position corresponding to their intersection O a ball-and-socket joint 2 on which the mirror body 3 is tiltably supported.

Plungers 5a and 5b are provided on the axes X-X' and Y-Y', respectively, for tilting the mirror body 3 about the vertical and horizontal axes, respectively. Each of the plungers 5a and 5b has a ball portion 6 provided at the end thereof as shown in FIG. 2. The ball portion 6 is fitted in recess formed in the rear side of the mirror body 3 to form a ball-and-socket joint. The plunger has an external thread formed on the outer circumference thereof and also a recess 7 formed axially in a part of the outer circumference. Each of reduction gear trains 11a and 11b is formed by a plurality of gears including a final gear 9a (9b) which is in mesh with the external thread of each plunger 5a (5b). The recess 7 receives a projection 8 provided on the drive unit casing 1. Thus each plunger is blocked against pivoting about the axis thereof, so the rotation of a motor 10a (10b) is converted into an axial movement of each plunger 5a (5b) through the last gear 9a (9b) of the reduction gear train 11a (11b). As the plunger 5a or 5b is moved axially, the mirror 4 tilts about the vertical or horizontal axis.

The adjustable range of the angulation of the mirror 4 is set for a field of vision required when the car moves normally on the road. The angulation speed is so set that the mirror angulation can be adjusted with an accuracy required in practice. If the mirror 4 is tilted too quick, a desired angulation cannot easily be attained.

However, in a special driving condition such as when moving the car back near the road edge or moving the car in the direction of its width by repeating forward and backward movement, it is desired to use the mirror for checking for any obstacle or the like near the rear wheel. For this purpose, it is necessary to quickly tilt down the mirror further through a predetermined angle from the angular position of the mirror in normal drive of the car.

In these circumstances, a side-mirror driving apparatus is desirably provided by which the mirror can be quickly tilted down through a predetermined angle for having a rear view toward the rear wheel and thereafter tilted back to its initial position for normal moving of the car. One of the mirror driving apparatuses of this type is disclosed in the U.S. Pat. No. 4,632,525. This apparatus comprises at least one lever or threaded rod having a longitudinal axis disposed in a casing and swingably linked to a rear surface of the mirror at one end thereof, and at least one driving means drivingly connected to the lever for reciprocating the lever along with the axis thereof so as to incline the mirror. The driving means includes a first rotating member rotatably held on the casing, a first motor for rotating the first rotating member, and a second rotating member rotatably and movably coupled to the casing in such a manner that the second rotating member reciprocates along with the axis of the lever. The first rotating member is connected to the second rotating member connected to the second rotating member in such a manner that the rotation of the first rotating member is transmitted to the second rotating member. A linkage means is drivingly so connected between the second rotating member and a second motor that the rotation of the second motor makes the second rotating member reciprocate along with the axis of the lever, and a driving connection means is drivingly so connected between the lever and the second rotating member that at least one of the rotation and the reciprocation of the second rotating member makes the lever reciprocate along with the axis of the lever.

In this side-mirror driving apparatus, the side mirror is inclined by a predetermined angle to confirm an obstacle behind the car by reciprocating the second rotating means along the axis of the lever or threaded rod by means of the linkage means which is driven by the second motor. In this state, the lever or threaded rod is reciprocated together with the second rotating member.

In the above-mentioned side-mirror driving apparatus, many components are housed in the casing. Particularly the plurality of link levers and gears forming the linkage means must be drivingly connected between the second rotating member and second motor. Thus assembling of them into the casing needs much labor and the adjustment of them is very complicated. Since the components of the linkage means are disposed apart from the axis of the lever or threaded rod, it is difficult to design a compact and thin casing.

SUMMARY OF THE INVENTION

Accordingly, it is an object of the present invention to provide an electrically remote-controlled mirror assembly having a mirror driving apparatus permitting a quick-rear-viewing in which the mirror in a predetermined angular position is easily and quickly tilted to an angular position through a further angle over a range of angulation required for normal car moving and thereafter quickly returned to its initial angular position, the mirror driving apparatus comprising a control mechanism which is of a simple and compact design and permits an accurate quick-rear-viewing.

The above object can be accomplished by providing a remote-controlled mirror assembly comprising, according to the present invention, a pair of plungers coupled with a mirror body and so disposed within a drive unit casing as to be moved forward and backward, respectively, by a pair of motors via reduction gear trains having a plurality of gears, respectively, to tilt the mirror body horizontally and vertically within certain pivot angles, and at least one driving mechanism for moving at least one of the plungers forward and backward to tilt the mirror body horizontally and vertically beyond the certain pivot angles.

In the driving mechanism, an external thread is formed on the circumference of one of the plungers, and a nut member is provided in the casing so as to be blocked against rotation relative to the casing, and has an internal thread provided along the center line thereof which is in mesh with the external thread of the plunger. Furthermore, a rotary member formed in a disk-like shape having upper and lower surfaces is provided in the casing. The rotary member has a drive shaft on the upper surface thereof, which is slidable with respect to but blocked against pivoting relative to the plunger.

The rotary member is rotated by a third motor. One of the plungers moves forward or backward while rotating along with the rotary member, thus tilting the mirror body horizontally or vertically beyond predetermined pivot angles for having a view of the rear wheel.

The driving mechanism has a control circuit means responsive to the rotation of the rotary member to control the stopping and changing of the rotational direction of the third motor. The control means comprises an electrically conductive ball disposed between an internal surface of the casing and the lower surface of the rotary member so as to roll on a predetermined track, two pairs of electric contacts provided on the internal surface of the casing, one pair being disposed as a first position corresponding to one end of the moving trace of the ball, and the other pair being disposed at a second position corresponding to the other end of the rolling track of the ball.

The first position corresponds to the predetermined angular position of the mirror in normal car moving, while the second position corresponds to the mirror angulation suitable for viewing of the rear wheel. When the ball is in contact with the one pair of electric contacts at the first position or the other pair of electric contacts, the third motor stops running. When the ball is rolling from the one pair of electric contacts at the first position toward the other pair of electric contacts at the second position, the third motor runs forward. When the ball is rolling from the other pair of electric contacts at the second position toward the one pair of electric contacts at the first position, the third motor runs reversely.

BRIEF DESCRIPTION OF THE DRAWINGS

FIGS. 10(A) thru 10(D) are schematic drawings for explanation of the geometric relation between the elongated recess formed spirally and radially in the base gear and the ball contact, of which FIG. 10(A) shows the geometric relation between the elongated recess and ball contact in a position for rear viewing in normal car moving, FIG. 10(B) shows such geometric relation during shift from position for rear viewing in normal car moving to that in viewing of the rear wheel, FIG. 10(C) shows such geometric relation in a position for viewing of the rear wheel, FIG. 10(D) shows such geometric relation during shift from position for rear viewing in viewing of the rear wheel to that in normal car moving.

FIG. 12(A) is an exploded perspective view of a variant of the switching mechanism including the ball contact; and FIG. 12(B) is a schematic diagram of two pairs of fixed contacts shown in FIG. 12(A).

DETAILED DESCRIPTION OF THE PREFERRED EMBODIMENTS

Figure 1:
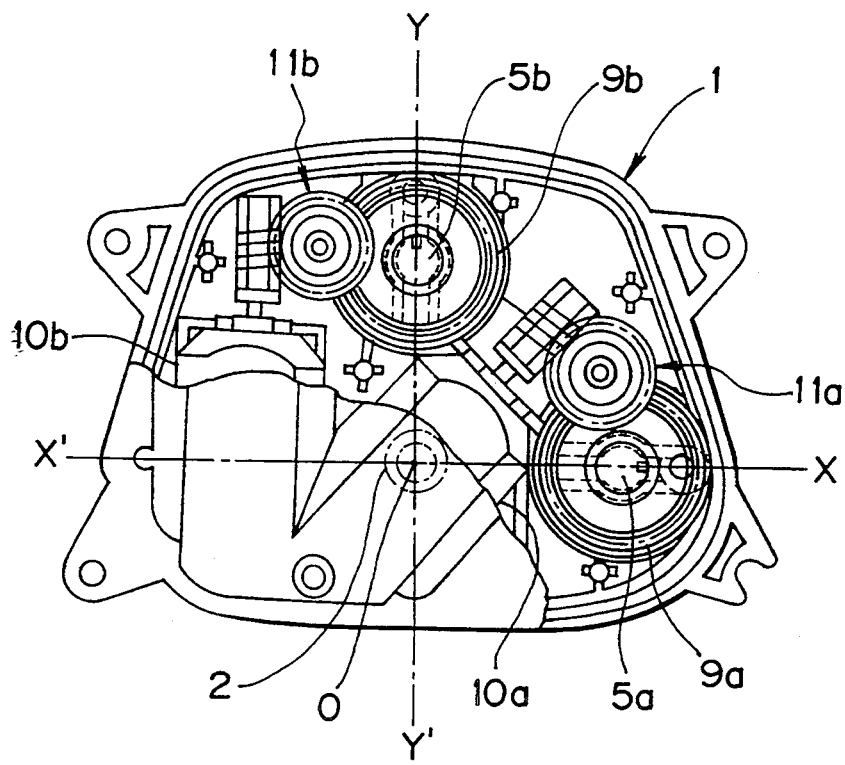
FIG. 1 is a plan view of the prior-art side-mirror driving apparatus, the cover of the drive unit casing being shown as partially fragmented.
Figure 2:
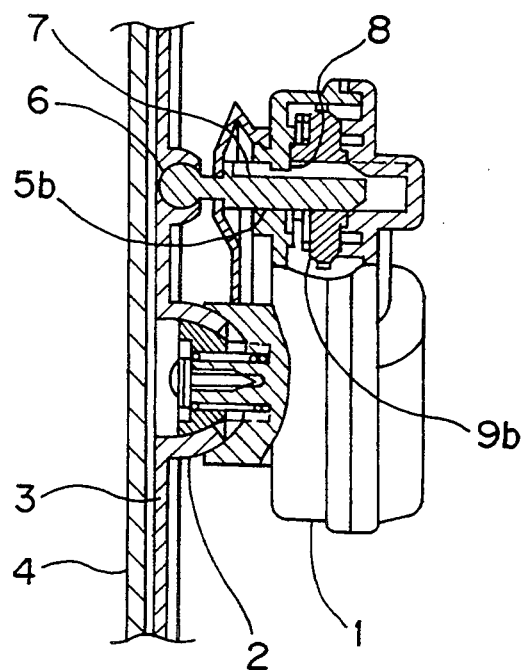
FIG. 2 is a partially fragmentary side elevation showing the mirror and mirror body mounted on the driving apparatus in FIG. 1.
Figure 3:
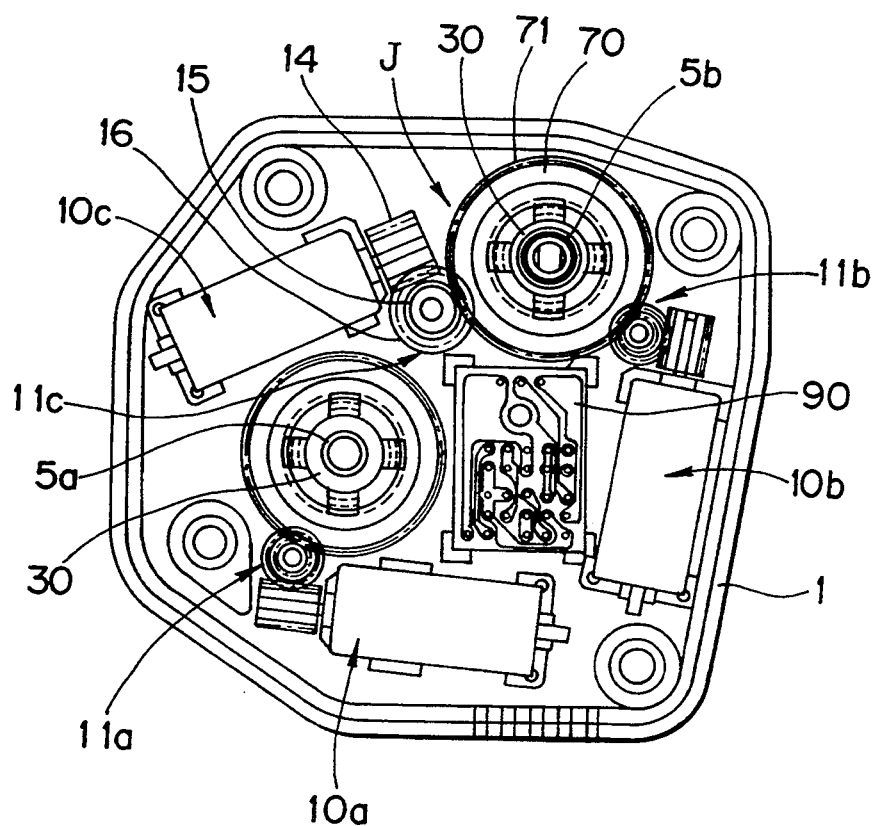
FIG. 3 is a plan view of one embodiment of the side mirror according to the present invention, the cover of the drive unit casing being being omitted.

FIGS. 3 thru 10 show together one embodiment of the remote-controlled mirror assembly according to the present invention. FIG. 3 corresponds to FIG. 1 of the prior-art side-mirror driving apparatus, showing the mirror driving apparatus in the first embodiment of the present invention. In FIG. 3, the same reference numerals as those in FIG. 1 designate the same or similar elements as or to those in FIG. 1.

Figure 4:
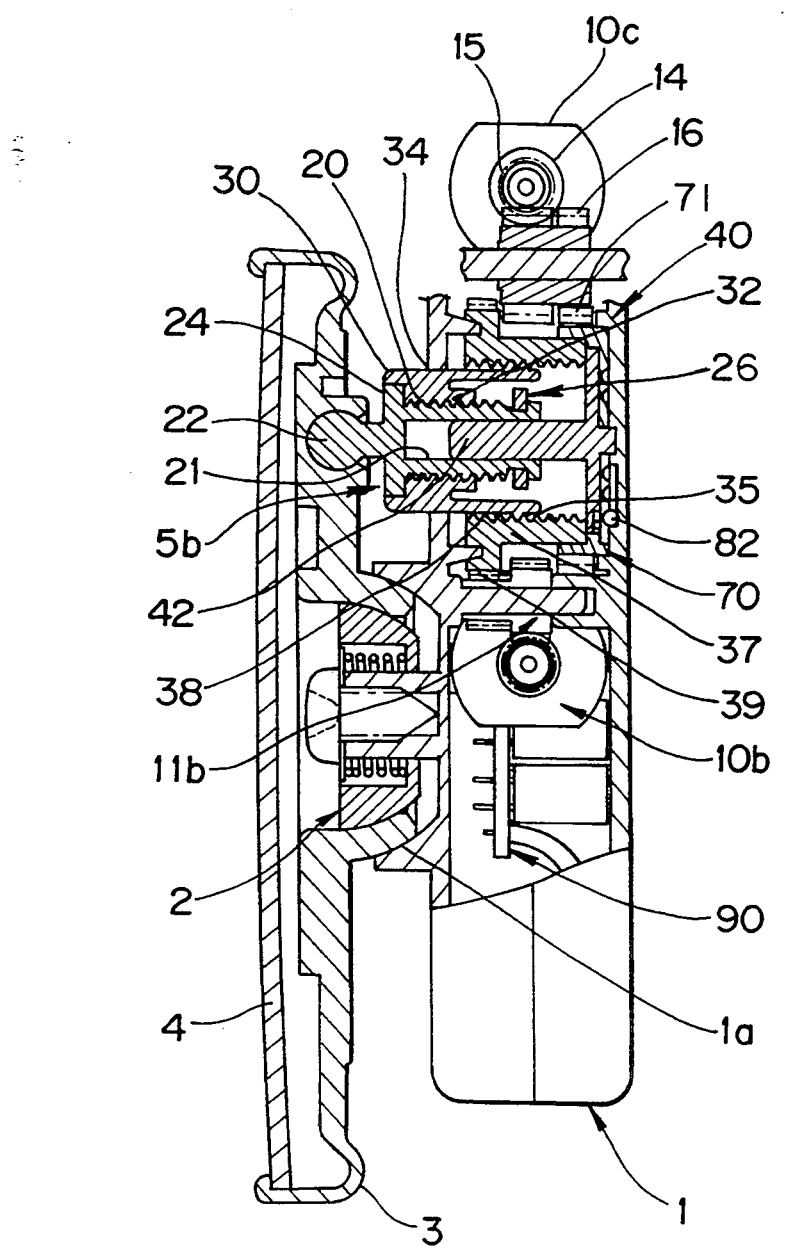
FIG. 4 is a side elevation of the side mirror, a part of the major part of the mirror driving apparatus in normal car moving being shown in sectional view.

As shown in FIG. 4, a drive unit casing 1 has supported thereon by means of a ball-and-socket joint 2 a mirror body 3 to which a mirror 4 is secured. The ball-and-socket joint 2 consists of a spheric seat 1a provided on the drive unit casing 1 and a ball portion 3a provided on the mirror body 3. There are provided in the drive unit casing 1 a plunger 5b which tilts the mirror 4 about the vertical axis within a predetermined range of angle, and a plunger 5b which tilts the mirror 4 about the horizontal axis within a predetermined range of angulation. These plungers 5a and 5b are driven by motors 10a and 10b, respectively, by means of reduction gear trains 11a and 11b, respectively, each comprising a plurality of gears. In this embodiment, the driving mechanism for tilting the mirror about the vertical and horizontal axes, respectively, within the predetermined ranges of angulation have a substantially same construction. So the following description will concern only the plunger 5b which tilts the mirror 4 about the horizontal axis within the predetermined range of angulation. As will be described later, there is provided for the plunger 5b a driving mechanism (designated with a reference J in FIG. 3) having a quick-rear-viewing function by which the mirror in the position for rear viewing in normal car moving is tilted further through a predetermined angle beyond the predetermined range of angulation in order to have a view of the rear wheel and thereafter tilts the mirror to its initial position.

The plunger 5b is formed like a tube of which one end is closed. Also it has an external thread 20 formed on the outer circumference thereof and a square hole 21 formed in the inner wall thereof.

The reference numeral 30 designates a nut member disposed movably through an opening 34 formed in the drive unit casing 1. It has formed axially therein an internal thread 32 which is in mesh or engaged with the external thread 20 of the plunger 5b. The nut member 30 has four flexible arm positions 33 extending in parallel with the axis of the plunger 5b as shown in FIG. 5. Each of these arm portions 33 has an external thread 35 formed on the lower end thereof. The inner circumferential edge of the above-mentioned opening 34 is so shaped as to permit the axial movement of the nut member 30 while inhibiting the rotation around the axis thereof.

The reference numeral 37 designates a driving cylinder supported rotatably relative to the drive unit casing 1 and of which both ends are open. The driving cylinder 37 has formed on the inner wall thereof an internal thread 38 which is in mesh with the four internal threads 35 of the nut member 30, and a gear 39 formed on the circumferential edge thereof along one of the open ends and which is connected to the reduction gear train 11b coupled to the motor 10b.

Hence, when the motor 10b is driven forward or backward while the motor 10c is stopping, the driving cylinder 37 is rotated forward or backward by means of the reduction gear train 11b. The rotation of the driving cylinder 37 causes the nut member 30 to move linearly to the right and left of FIG. 4. Since the plunger 5b is engaged or in mesh with the nut member 30, it is moved together with the nut member 30, thereby tilting the mirror body 3 vertically, namely, about the horizontal axis through a predetermined angle.

As mentioned above, the driving mechanism J intended for quick-rear-viewing, namely, adapted to tilt the mirror further through a predetermined angle beyond the predetermined range of angulation for viewing of the rear wheel and thereafter return the mirror to its initial angular position consists of a third motor 10c, a rotor 70 which is rotated by the third motor 10c, a transmission member 40 coupled to the rotor 70 by means of a clutch mechanism which will be described later and also coupled to the plunger 5b. The rotor 70 has formed on the outer circumference thereof a gear 71 to which the rotation of the motor 10c is transmitted through a worm 14 fixed to the output shaft of the motor 10c, a bevel gear or worm wheel 15 engaged with the worm 14 and an intermediate spur gear 16 disposed coaxially with the worm wheel 15. The gears 14, 15, 16 and 71 form together the reduction gear train 11c, and the gear 71 serves as the last gear of the reduction gear train 11c.

The transmission member 40 and rotor 70 are coupled to each other by means of a clutch mechanism 66 as will be described later. Normally, the rotor 70 and transmission member 40 rotate together, but they are uncoupled from each other when they are applied with a torque which exceeds a predetermined value.

Therefore, when the motor 10c is driven with the motor 10b stopped, the mirror 4 is tilted further through a predetermined angle beyond the predetermined angle. In this case, the rotor 70 and transmission member 40 are rotated together and the nut member 30 is inhibited from rotating about the axis thereof, so that the rotation of a square shaft 42 is converted into the rotation of the plunger 5b. As the plunger 5b is moved outwardly or inwardly while being rotated, the mirror body 3 is tilted down or up, respectively (counterclockwise or clockwise in the Figure).

As seen from FIG. 4, the movement of the plunger 5b with respect to the nut member 30 is limited by stoppers 24 and 26 provided on either end of the external thread 20 of the plunger 5b. Namely, the flange-shaped stopper 24 is formed integrally with the plunger 5b at the end thereof where the ball 22 is provided, while the stopper 26, that is, a snap ring, is fitted in an annular recess 28 formed on the plunger 5b at the opposite end thereof. In this embodiment, the movement of the plunger 5b with respect to the nut member 30 is limited to a maximum of about 10 mm.

Figure 5A:
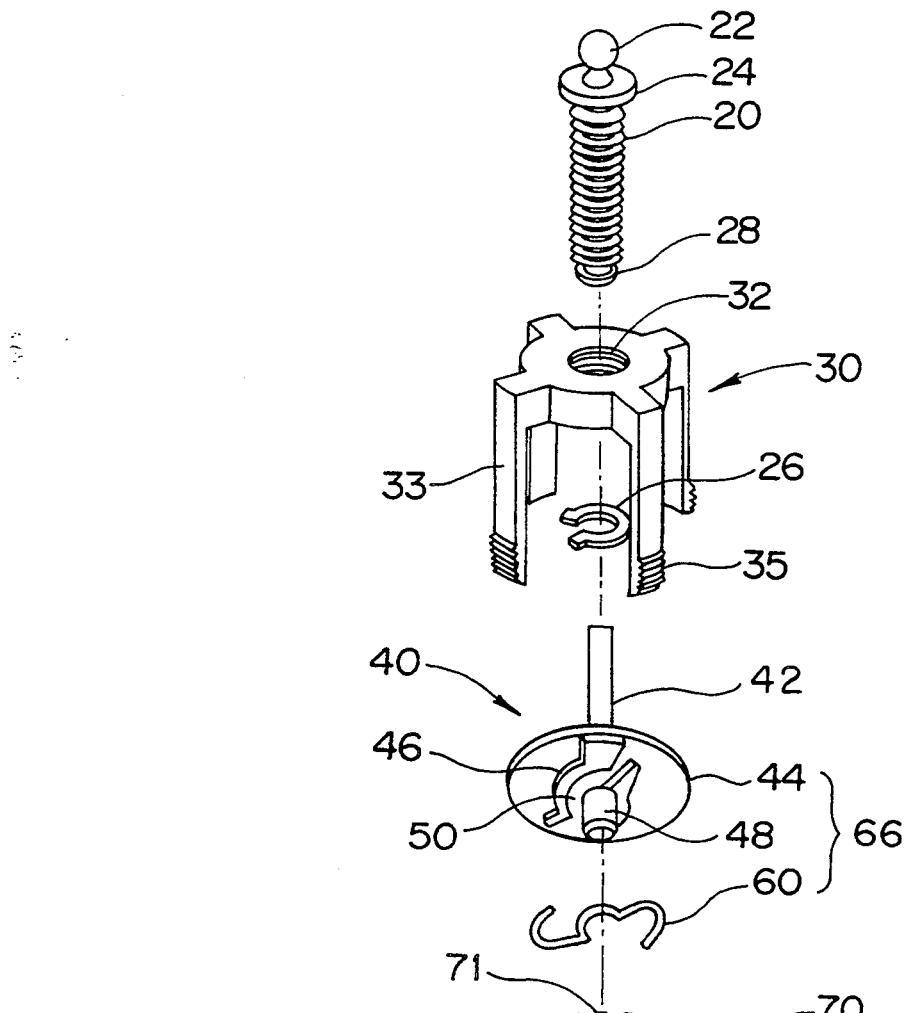
FIG. 5(A) is a schematic, enlarged-in-scale exploded perspective view of the major part of the mirror driving apparatus shown in FIG. 4.

As shown in FIG. 4, the plunger 5b has a square shaft or drive shaft 42 of the transmission member 40 inserted slidably in the square hole 21 thereof. FIG. 5(A) shows the drive shaft 42 drawn out of the plunger 5b and also taken out of the rotor 70. The coupling between the plunger 5b and transmission member 40 may be such that the drive shaft 42 is axially slidable and is blocked against relative rotation about the axis thereof. Therefore, the coupling may not always be any combination of the square hole and square shaft as in this case, but it may be a combination of, for example, a recess and elongated flat plate.

Next, a frictional clutch mechanism 66 coupling the transmission member 40 to the rotor 70 will be described herebelow. In this embodiment, the transmission member 40 comprises the drive shaft 42 slidably fitted in the square hole 21 of the plunger 5b, a flange 44 adapted to fit the top face of the rotor 70 disposed coaxially with the drive shaft 42, and a shaft portion 48 which is inserted into a hole 74 formed in the center of the rotor 70.

Figure 6A:
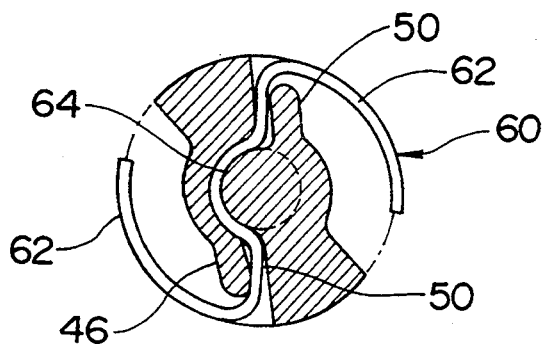
FIGS. 6(A) thru 6(C) are drawings for explanation of the action of the wire spring shown in FIG. 5.

The flange 44 has formed on the back thereof two projections 46 defining together a path 50 in which a wire spring 60 is fitted. As schematically illustrated in FIG. 6(A), the wire spring 60 has a generally Z shape consisting of two large circular bends 62 and a small circular portion 64. The wire spring 60 is lodged in a recess 76 formed in the top face of the rotor 70 with the small circular portion 64 fitted in the path 50 defined between the projections 46.

Figure 6B:
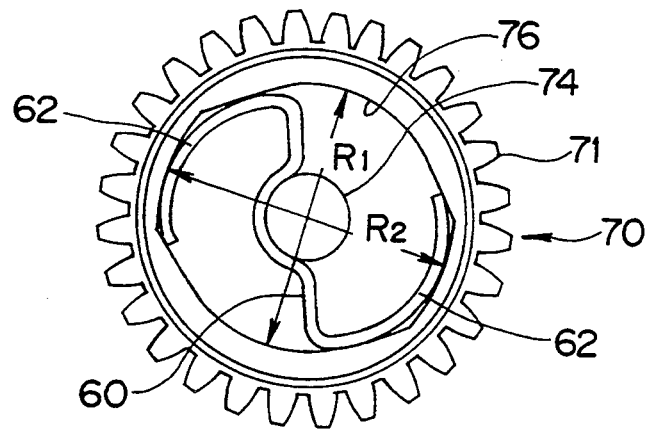

The recess 76 for lodging the wire spring 60 has an inner wall defined by a small diameter R1 and large diameter R2 as shown in FIG. 6(B). In the normal use, namely, when the mirror 4 is tilted about the horizontal axis within a predetermined range of angulation, the two circular bends 62 of the wire spring 60 abut the inner wall of the lodging recess 76 having the large diameter R2, ensuring an appropriate coupling between the transmission member 40 and rotor 70. Namely, a force can be assured which is necessary for the instantaneous motion of the mirror.

Figure 6C:
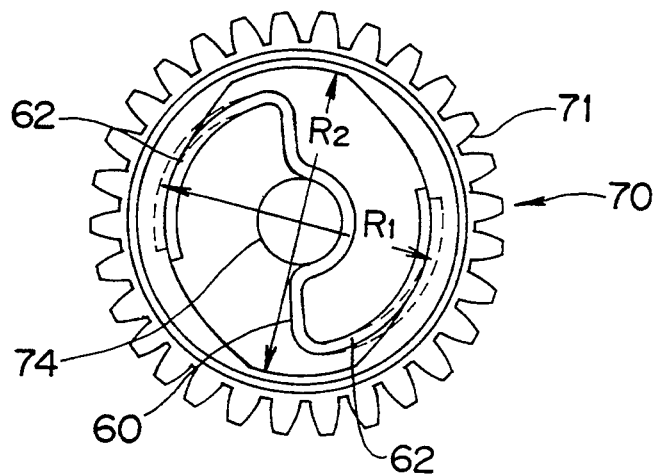

When the stopper 26 or 24 abuts the nut member 30 after the plunger 5b is moved forward or backward while being rotated, namely, when the plunger 5b has reached the end of stroke, the two circular bends 62 of the wire spring 60 fixed to the flange 44 of the transmission member 40 move from the inner wall defined by the large diameter R2 and abut the inner wall defined by the small diameter R1 as shown in FIG. 6(C) so that the rotor 70 idles. Thus since no larger torque than predetermined is transmitted from the rotor 70 to the transmission member 40, so the components of the transmission system will not possibly be damaged and the motor 10c will not possibly be burnt. As in the foregoing, the mirror 4 can be tilted independently by the motors 10b and 10c. When the mirror 4 is tilted further through a predetermined angle beyond a predetermined range of angulation as driven by the motor 10c and thus the stopper 26 or 24 of the plunger 5b abuts the nut member 30, the frictional clutch mechanism 66 will slip and the rotor 70 rotate will idle.

The clutch mechanism of a type that slips when a larger torque than predetermined is applied may be provided at an arbitrary place in the middle of the transmission system between the drive shaft 42 and motor 10c. As in this embodiment, however, it is more advantageous from the standpoint of torque control to provide the clutch mechanism near the last gear 71 of the reduction gear train 11c composed of a plurality of gears.

In this embodiment, the transmission member 40 and rotor 70 are coupled to each other by means of the clutch mechanism 66, but the rotor 70 and transmission member 40 may be formed integrally with each other, with the clutch mechanism 66 not provided, to drive to move the plunger 5b forward or backward while rotating.

In this embodiment, the speed of the motor 10c is about 1.56 times higher than that of the motor 10b. The gear ratio of the reduction gear train 11b is about 2.2 times greater than that of the reduction gear train 11c. Thus, the motor 10b tilts the mirror 4 at a rate of 3.3 sec/10°, while the motor 10c tilts it at a rate of 0.5 sec/10°. So the mirror 4 is tilted very quickly by the motor 10c.

The side-mirror driving apparatus according to the present invention is provided with a mechanism which controls the tilting of the mirror 4 by the motor 10c for the quick-rear-viewing. The control mechanism will be described in detail below.

Figure 5B:
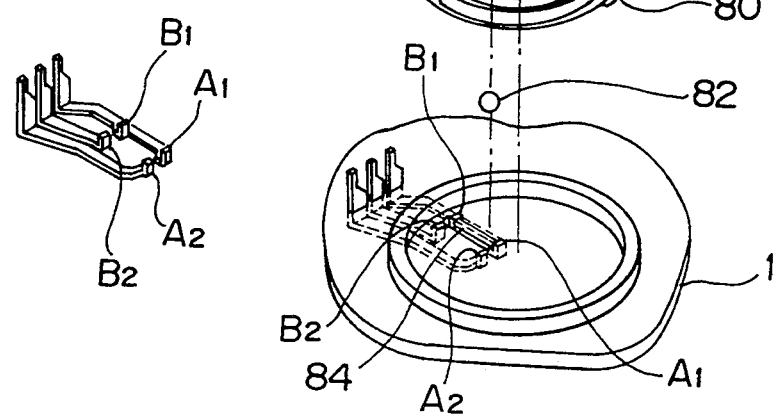
FIG. 5(B) is a schematic drawing of two pairs of fixed contacts shown in FIG. 5(A)
Figure 7A:
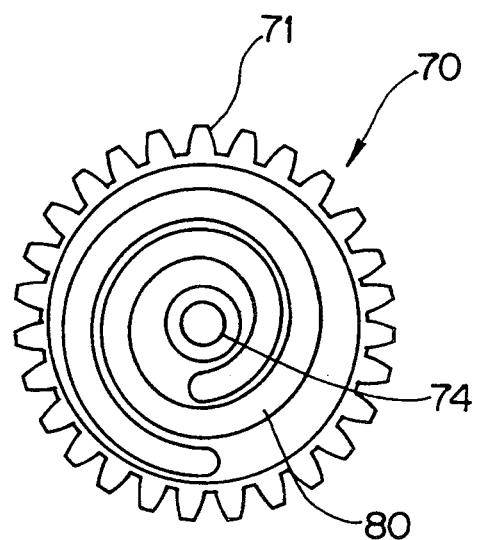
FIG. 7(A) is an enlarged-in-scale front view of the rotor shown in FIG. 4.
Figure 7B:
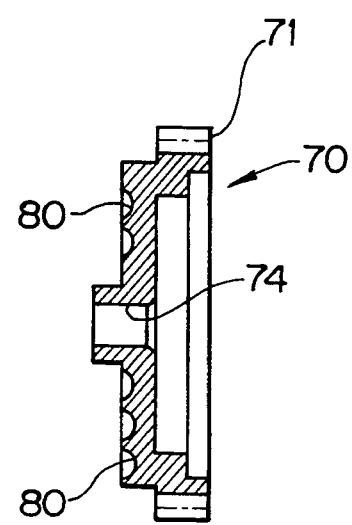
FIG. 7(B) is an enlarged-in-scale sectional view similar to FIG. 7(A)

The rotor 70 has formed on the bottom side thereof a spiral recess 80 of two turns (360°×2) as shown in FIGS. 7(A) and 7(B). A single electrically conductive ball 82 is disposed in this spiral recess 80. Further, the drive unit casing 1 has formed in the inner face thereof an elongated recess 84 radially of the rotor 70. Being caught between the rotor 70 and the inner face of the drive unit casing 1, the electrically conductive ball 82 can not only roll in the spiral recess 80 but also in the elongated recess 84. Therefore, as the rotor 70 rotates, the ball 82 rolls in the spiral recess 80 while moves in the elongated recess 84 toward or away from the center of the rotor 70. There are provided at both ends of the elongated recess 84 two pairs of fixed contacts A1 and A2, and B1 and B2 adapted to provide an electric continuity when they are in contact with the ball 82. The fixed contact pairs A1 and A2, and B1 and B2 form ball-contact type switches A and B, respectively, and are buried in the drive unit casing 1 but slightly project from the inner face thereof as shown in FIG. 5(A). FIG. 5(B) show the whole ball-contact type switches A and B buried in the drive unit casing 1.

Figure 8:
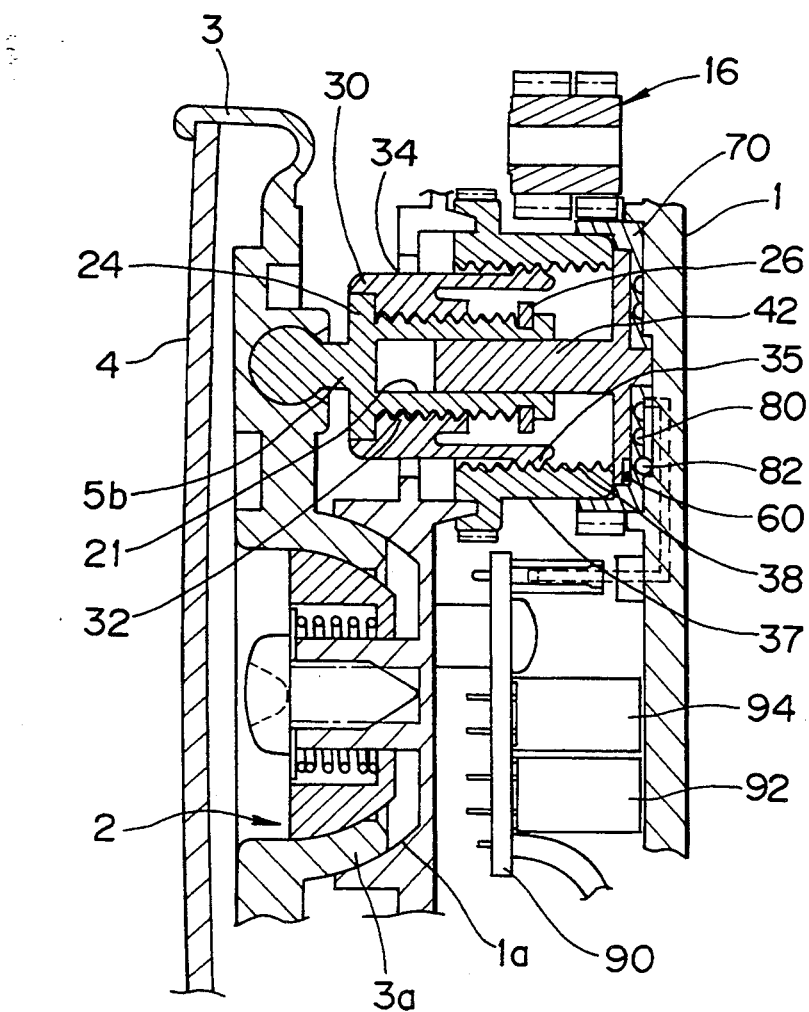
FIG. 8 is a sectional view of the mirror driving apparatus in normal car moving, showing the geometric relation between the components in the major part.
Figure 9:
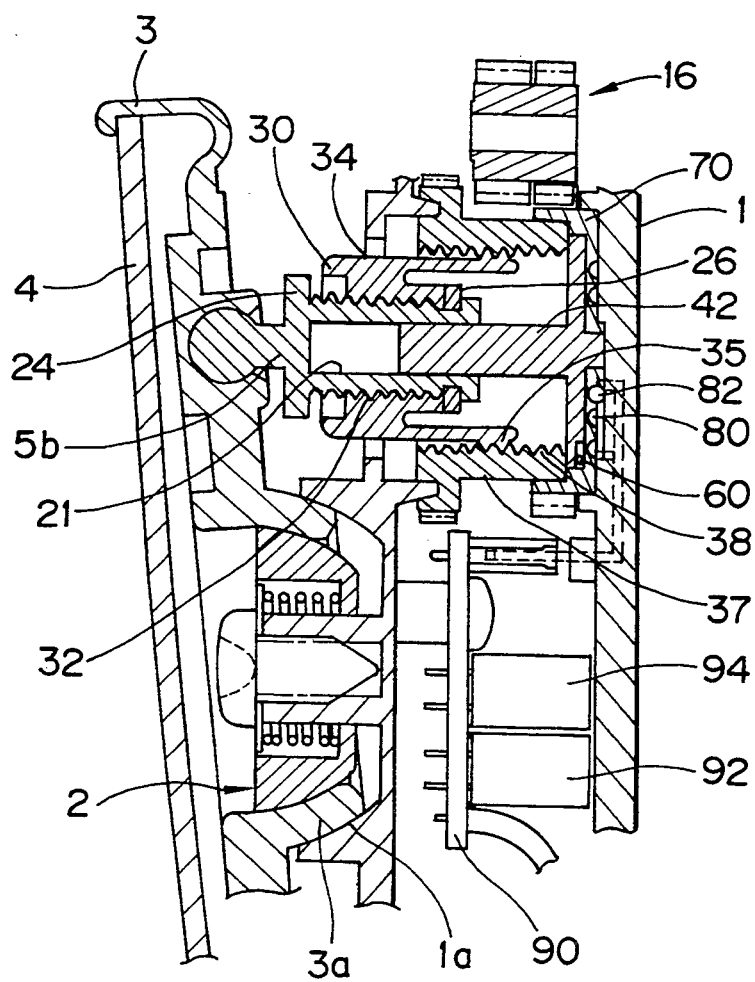
FIG. 9 is a sectional view of the major part of the mirror driving apparatus in a position for viewing of the rear wheel, showing the geometric relation between the components in the major part.

FIG. 8 shows the mirror 4 in an angular position suitable for checking the position of a car behind, or for rear viewing of the car, in the normal car moving. FIG. 9 shows the mirror 4 in an angular position suitable for viewing the rear wheel.

Figure 10A:
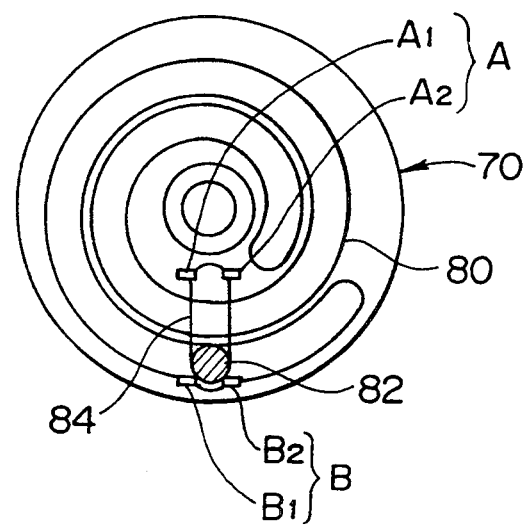

In FIG. 8, the mirror 4 is shown that is in a nearly upstanding or vertical posture. In this posture of the mirror 4, the flange-shaped stopper 24 abuts the nut member 30 and the snap ring-shaped stopper 26 is spaced from the nut member 30. FIG. 10(A) shows the geometric relation between the spiral recess 80, elongated recess 84 and ball 82 when the mirror 4 is set in a position for normal car moving. In this angulation of the mirror 4, the switch B composed of the fixed contacts B1 and B2 is closed.

Figure 10B:
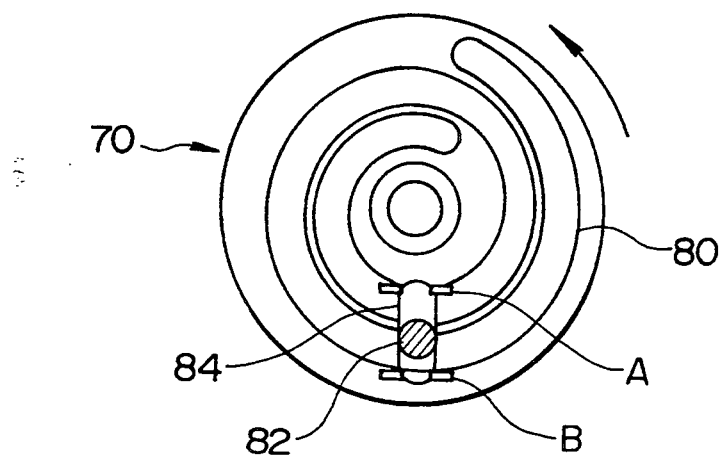
Figure 10C:
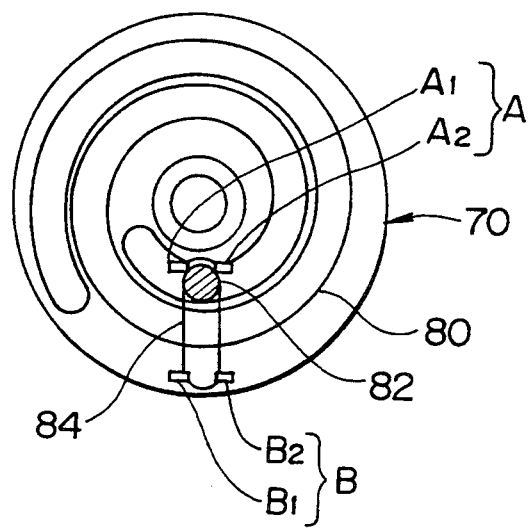

To tilt the mirror 4 from this position for normal car moving to the rear-wheel-viewing position, the motor 10c is driven to rotate the rotor 70 counterclockwise. Being guide in the elongated recess 83 while being in contact with the spiral recess 80, the ball 82 rolls toward the center of the rotor 70 as shown in FIG. 10(B) to close the switch A comprising the fixed contacts A1 and A2 as shown in FIG. 10(C). At this time, the mirror 4 is tilted down through a predetermined angle. In this angular position of the mirror 4, the snap ring-shaped stopper 26 abuts the nut member 30 while the flange-shaped stopper 24 is spaced from the nut member 30.

To let the mirror 4 return from the rear-wheel-viewing position to its initial position for normal car moving, the motor 10c is driven reversely to rotate the rotor 70 clockwise. The ball 82 returns to a position where it closes the switch B consisting of the fixed contacts B1 and B2 as shown in FIG. 10(A).

In this embodiment, the spiral recess 80 consists of about two turns of spiral so that when the rotor 70 rotates two turns, the ball 82 rolls from one end to the other end of the recess 84. The number of turns of the spiral recess 80 may be appropriately set and may be less than one (360°), for example. However, the larger the number of turns, the screw pitch of the internal thread 35 of the nut member 30 can be designed smaller for easier and more accurate control of the angulation of the mirror 4.

To accurately control the timing of rotation and stopping of the motor 10c, the driving mechanism for quick-rear-viewing according to the present invention has an electric circuit comprising the ball-contact type switches A and B as described above. FIG. 11 shows a such control circuit 100. The drive unit casing 1 has provided therein a printed circuit board 90 (as shown in FIG. 3) which has mounted thereon relays 92 and 94 to control the forward and backward rotations and stopping of the motor 10c. These relays 92 and 94 are opened and closed by the ball-contact type switches A and B and a manual switch D provided near the driver's seat. The manual switch D is used to quickly tilt the mirror 4 from the position for normal car moving to the position for viewing the rear wheel and to return the mirror 4 from the rear-wheel viewing position.

The relay 92 has a coil 3 of which the one end is connected to the switch A and the other end is connected to the positive terminal of a battery 96, and a coil h of which the one end is connected to the switch B and the other end is connected to the positive terminal of the battery 96. Double-pole double-throw contacts b, c and d, and e, f and g correspond to the coils a and b, respectively. Switching between the moving contact b and fixed contacts c and d, or that between the moving contact e and fixed contacts f and g, is done when either the coil a or h is energized. However, even when the coil a or h is deenergized, the moving contact b or e does not return to its initial position. Namely, the relay 92 has no return spring.

The moving contacts b and e corresponding to the coils a and h are always connected to the output terminal of the motor 10c. When the switch A is opened while the switch B is closed as shown in FIG. 11(A), the moving contacts b and e of the coils a and h, respectively, are connected to the fixed contacts d and g, respectively.

The other relay 94 is composed of a coil i of which the one end is connected to the manual switch D and the other end is connected to the positive terminal of the battery 96, and a moving contact j and fixed contacts k and l corresponding to the coil i. The moving contact j is always connected to the negative terminal of the battery 96. When the coil i is energized, the moving contact j is connected to the fixed contact k, and when the coil i is deenergized, the moving contact j is connected to the fixed contact l.

When the switches A, B and D are closed, respectively, each of the coils a, h and i is energized.

Figure 11A:
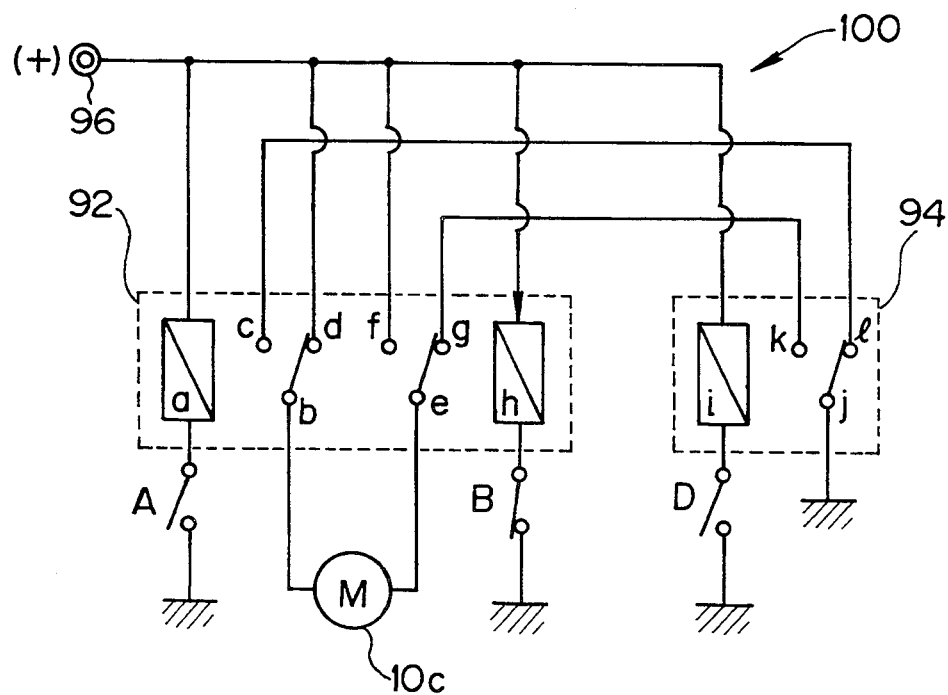
FIG. 11(A) is a schematic diagram of a circuit for controlling the motor run for quick motion of the mirror.

In the status shown in FIG. 11(A), the manual switch D is opened, coil i is deenergized and the moving contact j is in contact with the fixed contact l, so that the motor 10c is not energized. Thus, the motor 10c is stopping.

Figure 11B:
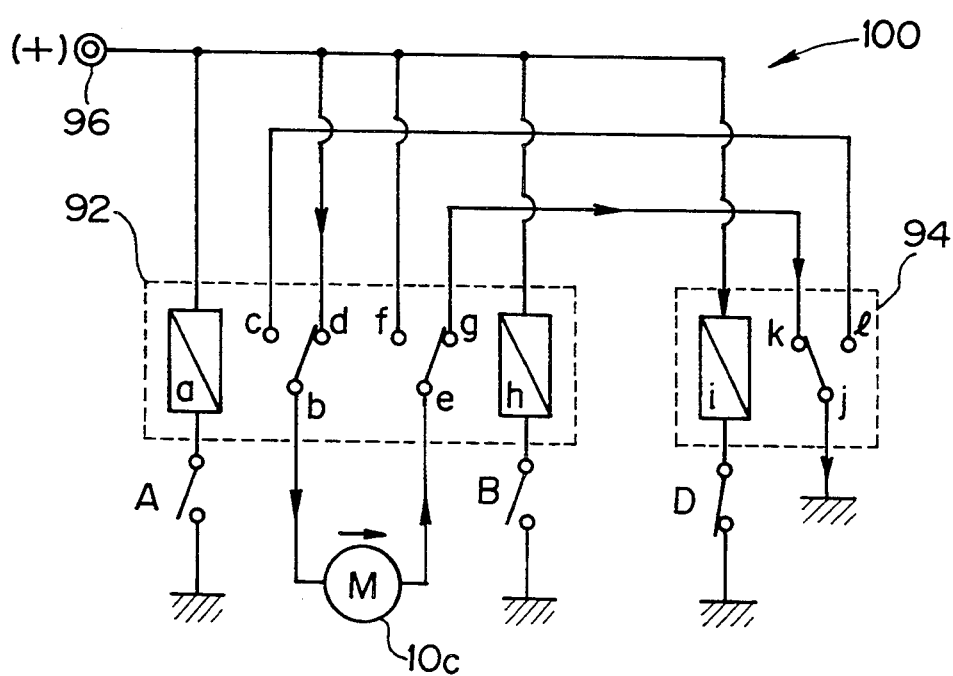
FIGS. 11(B) thru 11(D) are drawings for explanation of the operation of the control circuit shown in FIG. 11(A); these drawings showing the conditions shown in FIGS. 10(B) thru 10(D), respectively.

When the manual switch D is closed in this condition, the coil i of the relay 94 is energized and the moving contact j is in contact with the fixed contact k, so that the motor 10c is energized in the directions indicated with arrows in FIG. 11(B). Thus the tilting of the mirror 4 for quick-rear-viewing operation is started. After the motor 10c starts running, the ball 82 will roll upward of Figure along the elongated 84 as shown in FIG. 10(B) so that both the switches A and B are opened. However, since the coil i of the relay 94 is kept energized, the mirror 4 is continuously tilted for quick viewing of the rear wheel.

Figure 11C:
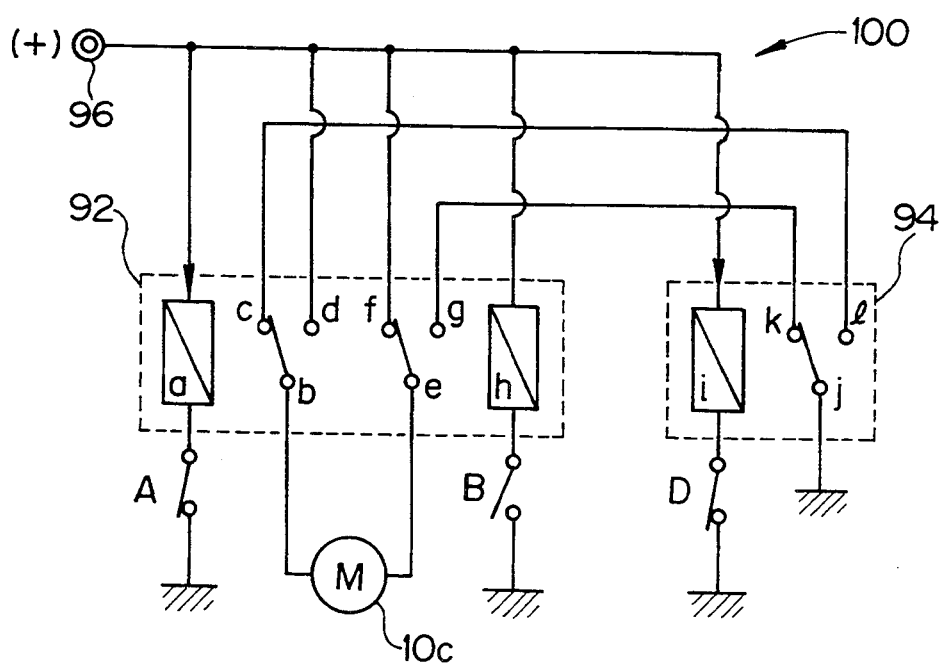
Figure 10D:
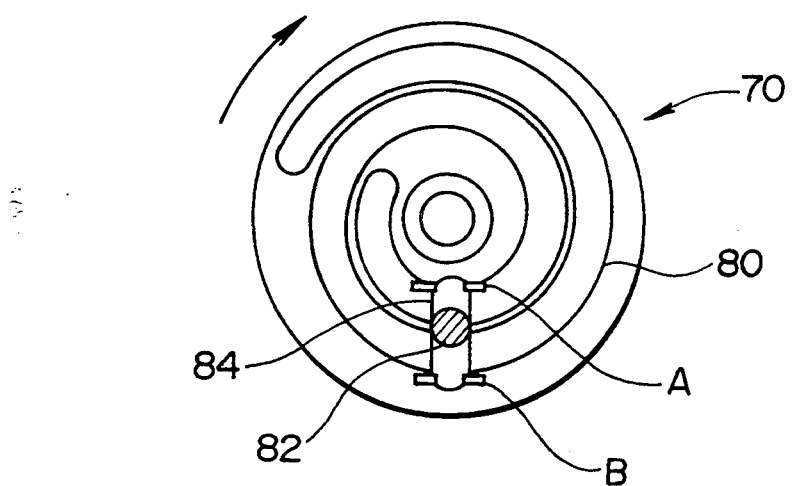

When the mirror 4 has reached the position for viewing of the rear wheel, the ball 82 reaches the upper end of the elongated recess 84 as shown in FIG. 10(C) and closes the switch A. Then, the coil a of the relay 92 is energized as shown in FIG. 11(C), the moving contacts b and e are switched to the fixed contacts c and f so that the motor 10c is deenergized. Also after this deenergization, the motor 10c will keep running due to the inertia for an extremely short time while being slowed down. However, this slight rotation for the short time is absorbed because the clutch mechanism slips.

Figure 11D:
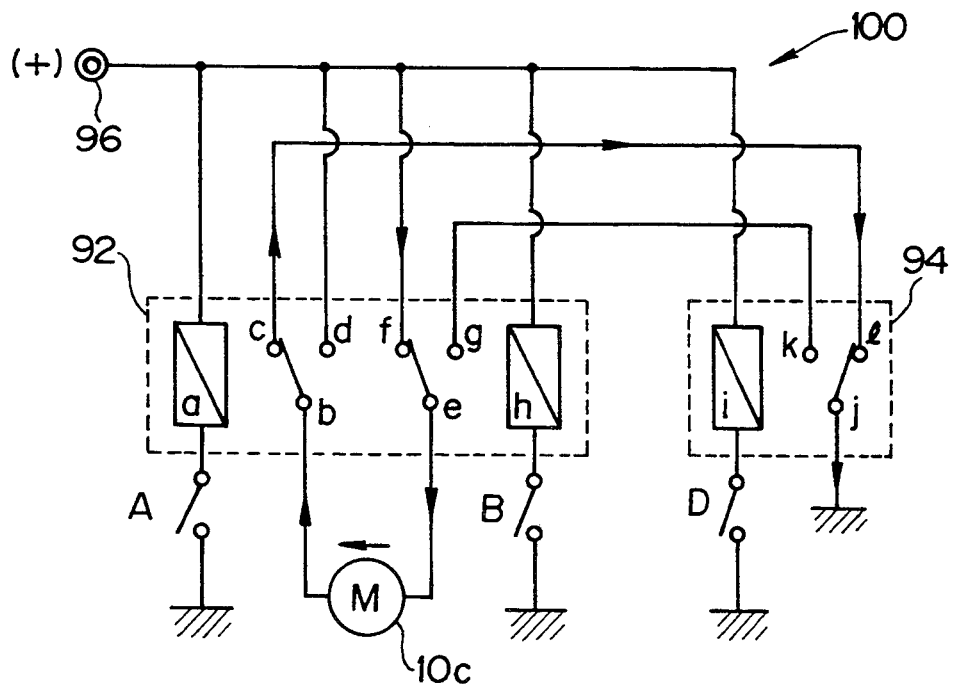

In the position for viewing the rear wheel as shown in FIG. 10(C), the switch A is closed. When the manual switch D is opened in this condition, the coil i of the relay 94 is deenergized as shown in FIG. 11(D) so that the moving contact j is switched from the fixed contact k to the fixed contact l. Therefore, the motor 10c rotates in a direction shown in FIG. 11(D) and the ball 82 rolls downward of Figure again in the elongated recess 84 until the switch B is closed. When the switch B is closed, the moving contacts b and e are switched to the fixed contacts d and g, respectively, so that the motor 10c is deenergized and stopped. Namely, the mirror 4 is returned quickly from the rear-wheel-viewing position to the position for normal car moving. However, the mirror 4 is ready for start of the quick tilting to the position for viewing the rear wheel.

It will be understood from the foregoing description that, in this embodiment, forward run of the motor 10c (for quick tilting of the mirror 4 for viewing the rear wheel) and reverse run of the motor 10c (for returning the mirror 4 to its initial position for normal car moving) are started by opening and closing the manual switch D, changeover from the forward run to reverse run of the motor 10c is done by the relays 92 and 94 and that the motor 10c is automatically stopped by the ball-contact type switches A and B.

The ball-contact type switch according to the present invention can be designed so compact that the drive unit casing 1 can have a marginal internal space and the circuit board 90 can easily be housed in the casing 1. Thus, since the circuit board 90 will not possibly be damaged when any external object collides with the mirror, it can be completely protected. Further, housing of the circuit board 90 in the casing 1 allows a limited number of wires led out through the wall of the drive unit casing 1 (2 wires will do except for the grounding wire in this embodiment).

In the aforementioned embodiment, only the plunger 5b is provided with the mirror driving mechanism having the quick-rear-viewing function by which the mirror is tilted further a predetermined angle beyond a predetermined range of angulation for viewing the rear wheel and thereafter returned to its initial angular position. However, such driving mechanism may also be provided for the plunger 5a which tilts the mirror 4 horizontally. In this case, a driving mechanism is composed of a fourth motor provided to drive the plunger 5a, another reduction gear train connected to the fourth motor, another rotor driven by the fourth motor by means of the reduction gear train, and another transmission member coupled to the rotor and also to the plunger 5a. The driving mechanism provided for the plunger 5a permits to further tilt the mirror 4 horizontally through a predetermined angle beyond the predetermined range of angulation, thereby providing a wider field of lateral view. This function of mirror angulation can be conveniently used when a car behind comes up with and passes by this car or in moving in a merging area of speedway FIG. 12(A) shows the major part of a variant of the mirror driving apparatus having been described in the foregoing, and FIG. 12(B) shows the entire ball-contact type switches A and B buried in the drive unit casing 1.

According to this variant, the rotor 70 has provided in the bottom thereof a concavity 83 which can receive the ball 82 to its half depth, and the drive unit casing 1 has formed on the inner face thereof a ball track 88 corresponding to the the circular orbit of the ball 82 pivoting along with the concavity 83 as the rotor 70 pivots. There are provided as buried at both ends of the circular ball track 88 two pairs of fixed contacts A1 and A2, and B1 and B2 of which each end is slightly exposed on the surface of the drive unit casing 1. Also in this arrangement, as the rotor 70 pivots, the ball 82 rolls on the ball track 88. When the rotor 70 has rolled nearly one full turn, the ball 82 abuts the fixed contacts A1 and A2 which in turn will be electrically connected to each other or abuts the fixed contacts B1 and B2 which in turn will be electrically connected to each other. The two projections 46 and wire spring 60 provided on the back of the flange 44 of the transmission member 40 are different in shape from those adopted in the aforementioned embodiment, but they serve for a similar clutching function.

In this variant, the rolling track 88 is not necessarily an essential element, and it may be omitted when the projection of the ball 82 from the concavity 83 is small.

The aforementioned embodiment and variant use a simple mechanism in which the ball 82 rolls and abuts two pairs of fixed contacts A1 and A2, and B1 and B2. Since the contacts are less abraded, the quick-rearviewing tilting of the mirror can be accurately controlled and the mechanism shows an excellent durability.

According to the side mirror according to the present invention having been described in the foregoing, the mirror can be quickly and easily tilted through a predetermined angle and returned to its initial position, the mirror driving mechanism can be designed compact, the plurality of components can easily be assembled into the drive unit casing, the driving mechanism is highly durable and has a high operational reliability.

Having described the present invention as related to the embodiment shown in the accompanying drawings, it is out intention that the present invention be not limited by any of the details of description, unless otherwise specified, but rather be constructed broadly within its spirit and scope as set out in the accompanying claims.

What is claimed is:

1. An electrically remote-controlled mirror assembly, comprising:
   a mirror;
   a mirror body supporting said mirror;
   a casing having a ball-and-socket joint which supports said mirror pivotably;
   a pair of plungers coupled with said mirror body and so disposed within said casing as to be moved forward and backward, respectively, by a pair of motors via reduction gear trains, each gear train comprising a plurality of gears, respectively, to tilt the mirror body horizontally and vertically within respective predetermined angles; and
   at least one driving mechanism for moving at least one of the plungers forward and backward to tilt the mirror body horizontally and vertically beyond said predetermined angles;
   said driving mechanism including:
   an external thread formed on the circumference of one of said plungers;
   a nut member so provided in said casing as to be blocked against rotation relative to said casing, and having an internal thread formed along the center line thereof which is engaged with said external thread of said plunger;
   a rotary member provided in said casing, which is shaped in the form of a disk having upper and lower surfaces, and having a drive shaft provided on the upper surface thereof, which is slidable with respect to but blocked against pivoting relative to said plunger;
   a motor for rotating said rotary member;
   a control circuit means for stopping and changing rotational direction of said motor in response to the rotation of said rotary member;
   said circuit means including:
   an electrically conductive ball disposed between an internal surface of said casing and the lower surface of said rotary member so as to roll on a predetermined track; and
   two pairs of electric contacts disposed on the internal surface of said casing, one of said pairs being disposed at a first position corresponding to one end of the rolling track of said ball, and the other pair being disposed at a second position corresponding to the other end of said rolling track of said ball.

2. An electrically remote-controlled mirror assembly according to claim 1, wherein said rotary member has a spiral recess formed on the lower surface thereof and said casing has provided on the internal surface thereof an elongated recess so radially formed as to be perpendicular to said spiral recess, said electrically conductive ball being arranged to roll in both said spiral and elongated recesses.

3. An electrically remote-controlled mirror assembly according to claim 2, wherein the first and second positions of the two pairs of said electric contacts correspond to one and the other end, respectively, of said elongated recess.

4. An electrically remote-controlled mirror assembly according to claim 2, wherein said spiral recess is of not less than a single turn.

5. An electrically remote-controlled mirror assembly according to claim 1, wherein said rotary member has formed on the lower surface thereof a concavity in which said electrically conductive ball can be fitted and roll and said casing has formed on the internal surface thereof a circular rolling track corresponding to the rolling track of said ball, the first and second positions of the two pairs of said electric contacts corresponding to one and the other end, respectively, of said circular rolling track.

6. An electrically remote-controlled mirror assembly, comprising:
   a mirror;
   a mirror body supporting said mirror;
   a casing having a ball-and-socket joint which supports said mirror pivotably;
   first and second plungers coupled with said mirror body and so disposed within said casing as to be moved forward and backward, respectively, to tilt the mirror body horizontally and vertically, respectively; and
   first and second driving mechanisms, including first and second motors, respectively, for moving said first and second plungers to tilt the mirror body horizontally and vertically, respectively;
   at least one of said first and second driving mechanisms comprising:
   an external thread formed on the circumference of at least one of said plungers;
   a nut member so provided in said casing as to be blocked against rotation relative to said casing, and having an internal thread provided along the center line of said plunger;
   a drive cylinder provided rotatably in said casing, and having an internal thread engaging the external thread of said nut member, and adapted to be driven by one of said first and second motors;
   a rotary member provided in said casing, which is shaped in the form of a disk having upper and lower surfaces, and having a drive shaft provided on the upper surface thereof, which is slidable with respect to but blocked against pivoting relative to said plunger;
   a third motor for rotating said rotary member; and electrical circuit means responsive to the rotation of said rotary member to control the stopping and changing of rotational direction of said third motor;

said circuit means including:

an electrically conductive ball disposed between an internal surface of said casing and the lower surface of said rotary member so as to roll on a predetermined track; and two pairs of electric contacts disposed on the internal surface of said casing, one of said pairs being disposed at a first position corresponding to one end of said rolling track of said ball, and the other pair being disposed at a second position corresponding to the other end of said rolling track.

* * * * *